(12) United States Patent
Roach

(10) Patent No.: US 7,314,241 B2
(45) Date of Patent: Jan. 1, 2008

(54) VEHICLE TAILGATE DAMPENER AND LIFT ASSIST SYSTEM

(75) Inventor: Jack Roach, Florence, SC (US)

(73) Assignee: AVM Industries, Inc., Novi, MI (US)

( * ) Notice: Subject to any disclaimer, the term of this patent is extended or adjusted under 35 U.S.C. 154(b) by 210 days.

(21) Appl. No.: 11/009,427

(22) Filed: Dec. 10, 2004

(65) Prior Publication Data

US 2005/0116491 A1 Jun. 2, 2005

Related U.S. Application Data

(62) Division of application No. 10/421,328, filed on Apr. 23, 2003, now Pat. No. 6,854,781.

(51) Int. Cl.
*B60P 1/267* (2006.01)

(52) U.S. Cl. ........................ 296/57.1; 296/50

(58) Field of Classification Search ............... 296/57.1, 296/50, 61; 49/352, 386; 414/537
See application file for complete search history.

(56) References Cited

U.S. PATENT DOCUMENTS

| 514,076 | A | 2/1894 | Hotz |
|---|---|---|---|
| 709,193 | A | 9/1902 | Barson |
| 2,260,504 | A | 10/1941 | Barrett |
| 3,306,655 | A | 2/1967 | Voehringer |
| 4,348,045 | A | 9/1982 | Hori et al. |
| 4,691,956 | A | 9/1987 | Hodge |
| 5,271,652 | A | 12/1993 | Watanabe et al. |
| 5,449,212 | A | 9/1995 | Seifert |
| 5,954,383 | A | 9/1999 | Beck et al. |
| 6,126,223 | A | 10/2000 | Rayburn |
| 6,196,609 | B1 | 3/2001 | Bowers |
| 6,341,809 | B1 | 1/2002 | Chapman |
| 6,854,781 | B2 * | 2/2005 | Roach .................. 296/57.1 |

\* cited by examiner

*Primary Examiner*—Stephen Gordon
(74) *Attorney, Agent, or Firm*—Carlson, Gaskey & Olds, P.C.

(57) ABSTRACT

A control mechanism for controlling movement of a vehicle gate between a first and a second position comprises a dampener assembly and a lift assembly that are incorporated within the gate. The dampener assembly has a first component mountable to a vehicle structure and a second component supportable by the vehicle gate mounted for pivotal movement relative to the vehicle structure. The first and second components cooperate to control vehicle gate speed as the vehicle gate is moved from the second position to the first position. The lift assembly includes a spring operatively coupled to the dampener assembly to reduce lifting effort as the vehicle gate is moved from the first position to the second position.

5 Claims, 3 Drawing Sheets

VEHICLE TAILGATE DAMPENER AND LIFT ASSIST SYSTEM

The application is a divisional of U.S. application Ser. No. 10/421,328, U.S. Pat. No. 6,854,781, which was filed on Apr. 23, 2003.

BACKGROUND OF THE INVENTION

This invention relates to a lift assist system for a tailgate of a vehicle, such as a pickup truck or sport utility vehicle.

A tailgate for a vehicle, such as a pickup truck or sport utility vehicle, is typically hinged to a vehicle support or frame member and may be opened and closed by pivoting the tailgate about its hinge to facilitate access to a truck bed or passenger compartment. A tailgate may be very heavy, particularly in the case of sport utility vehicles, because window lift and position control components are often housed within the tailgate. As a consequence, some assistance may be necessary to open and close the tailgate.

Systems do exist that provide lift assistance for the tailgate of the vehicle. Indeed, several known systems employ springs to counterbalance the weight of the tailgate. These springs are located in the sidewalls of the bed of the vehicle. One such system attaches one end of a cable to a spring in the sidewall of the vehicle and the other end to the tailgate. When the tailgate is lowered, the spring expands. Lift assistance to the tailgate is then provided by the returning spring as the tailgate is lifted.

Such a system, however, has several drawbacks. The spring force must be closely balanced with the weight of the tailgate so that a vehicle occupant may easily close the tailgate. However, as a consequence, very little upward lift may cause the tailgate to close quickly.

In addition, a driver of the vehicle may desire to keep the tailgate open during vehicle operation, so as to accommodate oversized loads that may extend beyond the vehicle bed or to allow loading or unloading of the vehicle while moving. Due to the counterbalancing effect of the spring, over rough roads, the tailgate may close when the driver prefers it to remain open. The tailgate may also bounce up and down on these roads more so than without the lift assistance. A fluctuating tailgate places stress on the tailgate hinge as well as the lift assist system.

Moreover, it is very difficult to install the spring in the sidewall during vehicle production. Specifically, the spring must be mounted to the sidewall during assembly of the vehicle body, which is difficult to access because the sidewalls typically form an integral part of the body. Sidewalls for a sport utility vehicle are especially difficult to access because of the integration of the sidewalls with a vehicle roof. Installing a spring inside the sidewall accordingly interferes with the assembly of the vehicle body.

Another option would be to install the assist spring outside the sidewall, which avoids interruption of body assembly. However, the spring is then open to the environment and more susceptible to wear and damage. Thus, it is preferable to keep the spring housed and protected.

Another disadvantage with existing systems is that when the tailgate is opened, the weight of the tailgate is supported in part by the compressed spring. This design places significant stress on the spring and housing for the spring and requires significant reinforcement. As a result, installation of the lift system is time consuming and expensive.

A need therefore exists for a tailgate assembly that incorporates a lift assist system without the drawbacks encountered by existing systems.

SUMMARY OF THE INVENTION

The present invention comprises a control mechanism for controlling movement of a vehicle tailgate between open and closed positions. In contrast to existing assemblies, the invention combines a dampener assembly with a lift assembly. The dampener has a first component mounted to a vehicle structure, such as a vehicle sidewall, and a second component supported by a tailgate and mounted for pivotal movement relative to the vehicle structure. The first and second components cooperate to slow tailgate speed as the tailgate is moved between a closed position and an open position. The lift assembly includes a spring that is coupled to the dampener assembly to reduce lifting effort as the tailgate is moved from the open position to the closed position. Preferably, the spring and dampener assembly are incorporated into the tailgate.

The spring stores energy when the vehicle tailgate moves toward the open position and releases energy when the vehicle tailgate moves toward the closed position. The damper assembly helps slow movement of the tailgate as the tailgate is pivoted from the closed position to the open position. In this way, the invention prevents the tailgate from closing upon the slightest disturbance or opening too quickly while still providing adequate lift assistance.

In one disclosed embodiment, the dampener assembly includes a cable and a piston slidably received within a cylinder. The cable is attached to the piston by a rod. The rod moves in a linear direction parallel to a lateral axis about which the tailgate pivots. A guide is used to redirect the cable to the vehicle structure along a long axis that is transverse to the lateral axis.

As discussed above, the lift spring and related components are preferably enclosed within the tailgate, which facilitates assembly because the tailgate is not an integral part of the vehicle body. Moreover, enclosing the spring and dampener assembly within the tailgate provides a protected environment. The spring is further protected from the environment by being enclosed within the dampening cylinder.

In one disclosed embodiment, a rigid stop is used to prevent a catch on the cable from moving beyond an end of travel position. The stop is preferably mounted to the tailgate. The stop and catch cooperate to prevent the piston and the rod from bearing the load of the tailgate and any associated payload weight when in the open position.

A latching device is also preferably incorporated within the control mechanism. The latching device is movable between a first position in which the spring is prohibited from providing lift assistance and a second position in which the spring is released to provide lift assistance. The latching device prevents an unloaded tailgate from bouncing up and down as the vehicle is driven with the tailgate in the open position and further prevents the tailgate from inadvertently closing. The latching device is preferably actuated by the tailgate latch handle.

BRIEF DESCRIPTION OF THE DRAWINGS

The various features and advantages of this invention will become apparent to those skilled in the art from the following detailed description of the currently preferred embodiment. The drawings that accompany the detailed description can be briefly described as follows.

DETAILED DESCRIPTION OF THE PREFERRED EMBODIMENT

Figure 1:
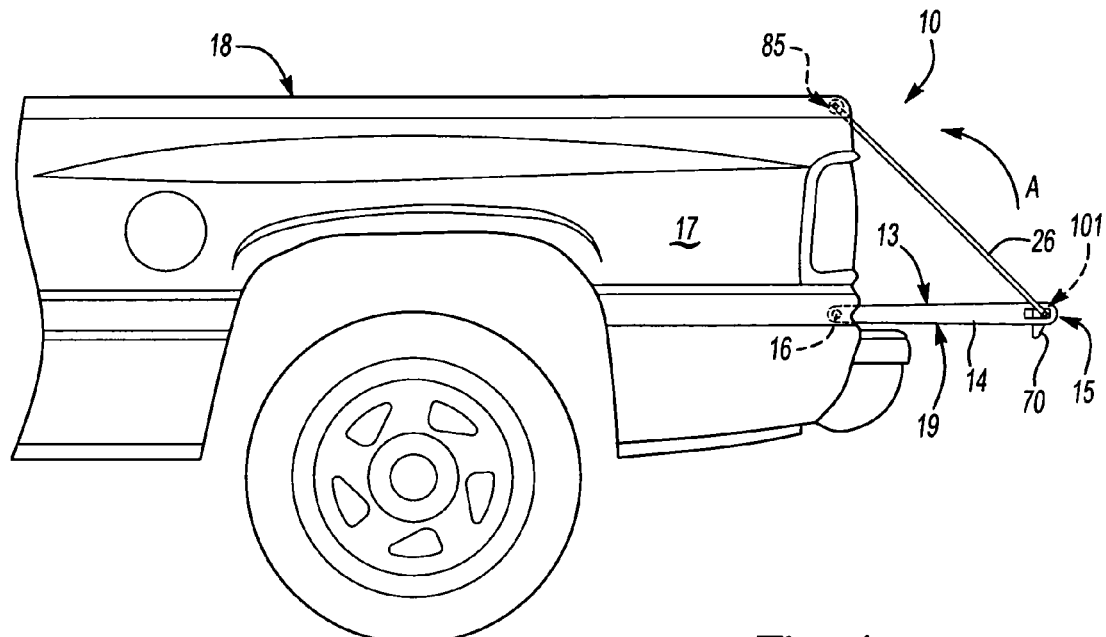
FIG. 1 illustrates a side view of a vehicle and a tailgate in an open position.
Figure 2:
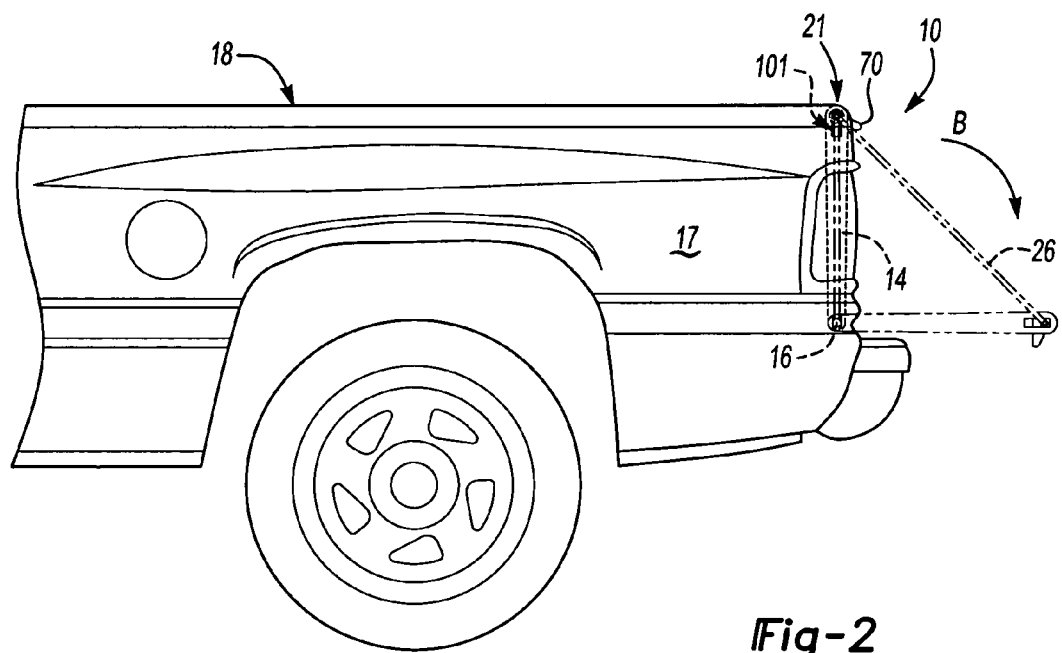
FIG. 2 illustrates a side view of the vehicle and the tailgate of FIG. 1 with the tailgate in a closed position.

FIGS. 1 and 2 show a side view of tailgate assembly 10 for vehicle body 18. The tailgate assembly 10 comprises tailgate 14 attached to vehicle body 18 with a hinge 16. In FIG. 1, tailgate 14 pivots about hinge 16 in a direction indicated by arrow A to closed position 21 (see FIG. 2) while in FIG. 2, tailgate 14 pivots in a direction indicated by arrow B to open position 15 (see FIG. 1). Although tailgate 14 is shown here as part of a pickup truck, tailgate 14 may also be used with other vehicles, such as a sport utility vehicle.

Figure 3:
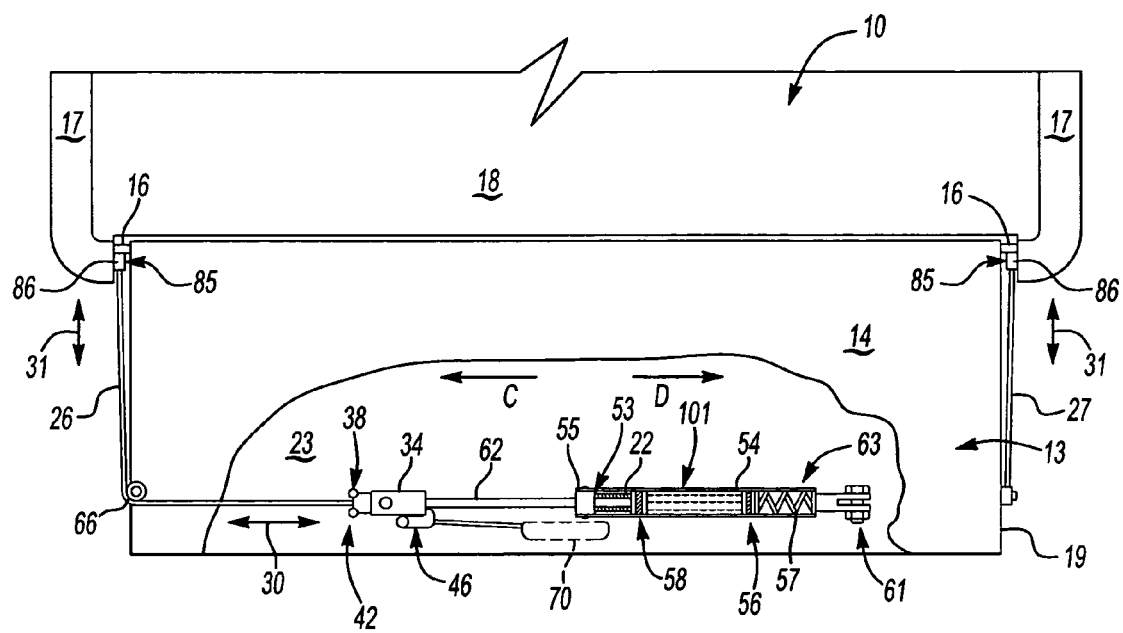
FIG. 3 illustrates an overhead view of the inventive lift assembly, including cable stop, catch, decoupling device, and dampener with the tailgate in the open position of FIG. 1.

As shown in FIG. 3, tailgate assembly 10 employs a spring 22 to provide lift assistance to tailgate 14 and a dampener 101 to control the opening speed of the tailgate 14. The dampener 101 comprises a piston and cylinder assembly that utilizes a dampening effect to reduce the speed at which the tailgate 14 opens. This prevents a heavy tailgate from opening too quickly. Spring 22 is housed within cylinder 54 between a spring retainer 55 and a first piston 58. Of course, spring 22 may also be mounted outside of cylinder 54 as well. The spring retainer 55 is fixed within cylinder 54, while the first piston 58 is free to move axially within cylinder 54. Moreover, the first piston 58 is attached to a rod 62 such that when rod 62 extends in a linear direction indicated by arrow C out of cylinder 54, the first piston 58 compresses spring 22 to store energy for lift assistance. Spring 22 decompresses to release energy for lift assistance when rod 62 moves in a direction indicated by arrow D as shown in FIG. 4.

Hydraulic fluid may be provided within cylinder 54 to dampen movement of rod 62 from its extended and retracted position. While cylinder 54 is shown here as a hydraulic cylinder, other dampeners, such as a pneumatic dampener, may be employed. The invention is not limited to any particular type of dampener.

Figure 5:
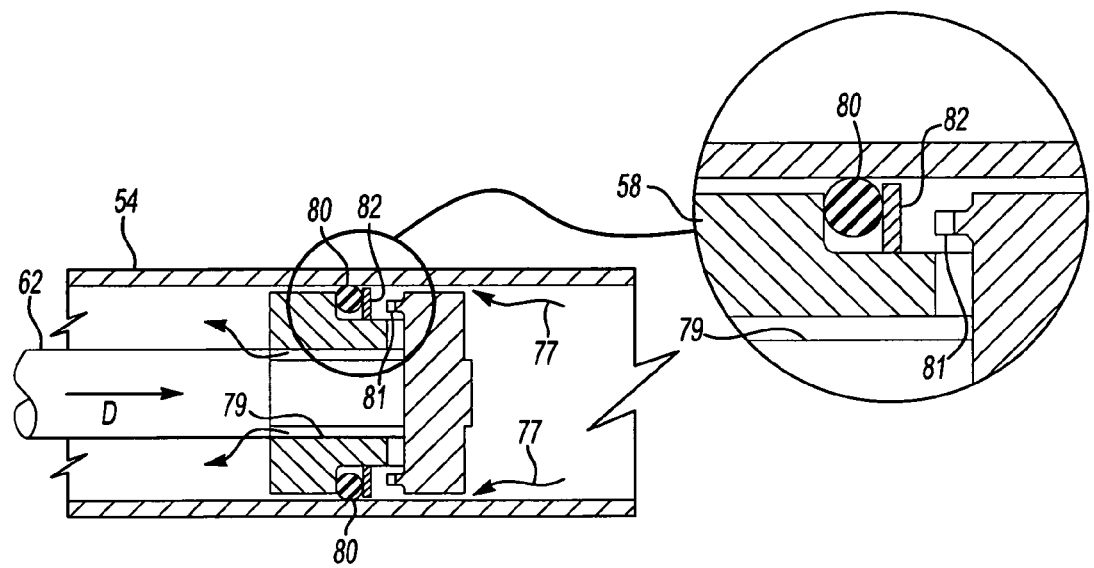
FIG. 5 shows a piston of the lift assistance device with the rod compressed in the cylinder.
Figure 6:
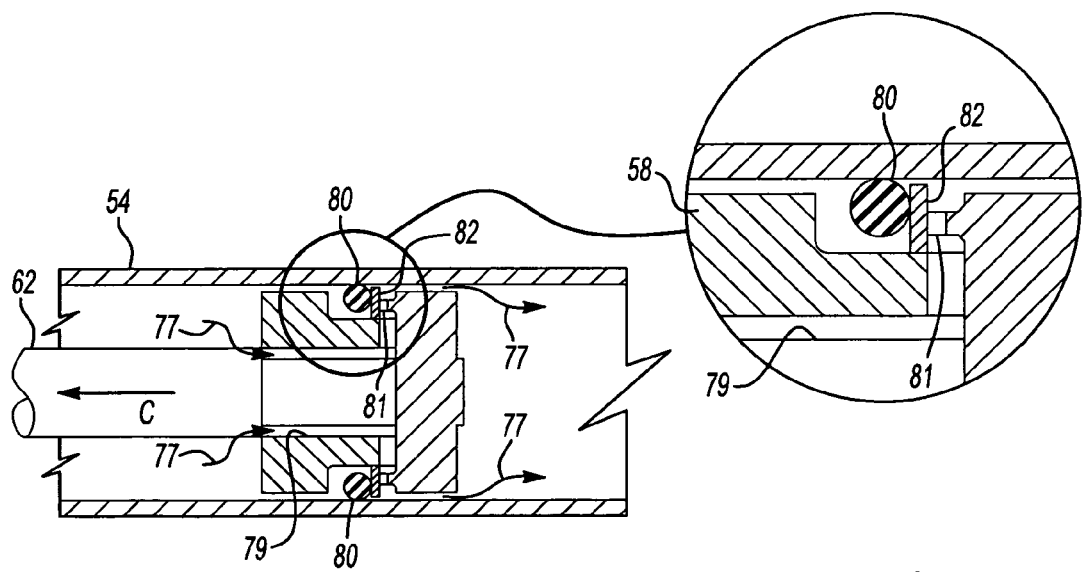
FIG. 6 shows the piston of FIG. 5 with the rod extended from the cylinder.

FIGS. 5 and 6 show a particular cylinder design for a hydraulic dampener. Cylinder 54 has rod 62 disposed therein. Rod 62 may compress into cylinder 54 as shown in FIG. 5 in the direction of arrow D and may extend from cylinder 54 as shown in FIG. 6 in the direction of arrow C. Rod 62 is attached to first piston 58. First piston 58 has O-ring 80, valve disc 82 and orifice plate 81. O-ring 80 prevents hydraulic fluid flow around the outside of first piston 58. When rod 62 compresses within cylinder 54, O-ring 80 and valve disc 82 are forced away from orifice plate 81, thereby producing a large non-restrictive flow path 79 for hydraulic fluid 77. At extension, friction on O-ring 80 forces valve disc 82 against the coined orifice plate 81 to restrict flow path 79 thereby slowing down the motion of rod 62 during extension, such as when tailgate 14 is opened along the direction of arrow B (see FIG. 2).

Figure 4:
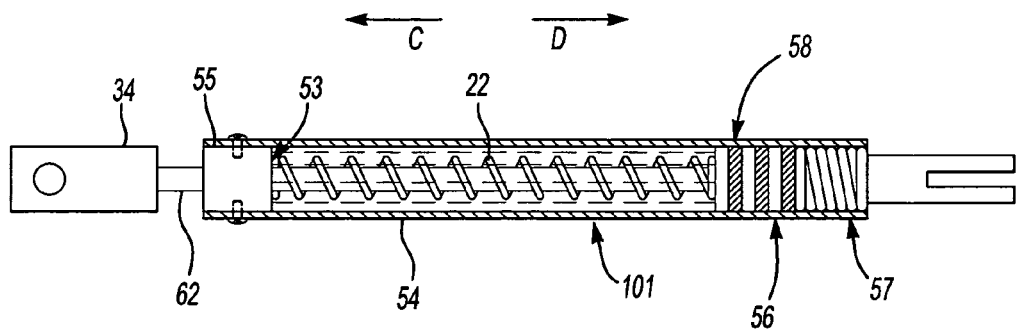
FIG. 4 illustrates the lift assistance device of FIG. 3 in its retracted position with the tailgate closed.

As shown in FIGS. 3 and 4, a second piston 56 and a second spring 57 are also disposed within cylinder 54 and serve to control hydraulic fluid pressure within cylinder 54. The second piston 56 is located near one end 63 of cylinder 54 and is spaced apart from the first piston 58 and spring retainer 55. While hydraulic fluid fills cylinder 54 between the rod seal 53 and the second piston 56, no hydraulic fluid fills cylinder 54 between the second piston 56 and end 63. Instead, the second spring 57 extends between the second piston 56 and end 63. The second spring 57 exerts force on the second piston 56, which, in turn, exerts pressure on hydraulic fluid between the rod seal 53 and the second piston 56. This pressure helps prevent cavitation of the hydraulic fluid 77 as it passes through the orifice of orifice plate 81 when the first piston 58 moves in a direction indicated by arrow C. The second piston 56 is free to move axially in cylinder 54 in relation to the movement of rod 62. As rod 62 moves in direction C, second piston 56 moves in direction C, and likewise for direction D. Hydraulic fluid 77 is incompressible, therefore, as rod 62 moves in and out of cylinder 54 the volume it displaces must be offset by a like volume from the movement of second piston 56 in cylinder 54.

In contrast to existing systems, spring 22 and cylinder 54 are mounted to tailgate 14 at mounting 61. As shown, mounting 61 may comprise a pivot that connects cylinder 54 to tailgate 14. The location of spring 22 on tailgate 14 greatly simplifies installation of spring 22 to the vehicle, as tailgate 14 is separately installed from vehicle body 18. Moreover, assembly of spring 22 to tailgate 14 does not interfere with the construction of vehicle body 18. As shown by cutaway in FIG. 3, spring 22, cylinder 54, and other associated components are installed within interior 23 of tailgate 14 between a first exterior surface 13 of tailgate 14 and a second exterior surface 19 of tailgate 14. Thus, spring 22 and other components are protected from the environment without having to install them into sidewalls 17 of vehicle body 18. However, although this protected mounting arrangement is a desirable feature, it is not necessary for the lift assist system to operate.

As shown in FIG. 3, tailgate 14 utilize first cable 26 and second cable 27 to control movement of the tailgate 14 and to support the actual weight of the tailgate in addition to any payload positioned on the tailgate when in the open position. Second cable 27 extends from sidewall 17 to tailgate 14 along longitudinal axis 31 and supports part of the weight of tailgate 14. The other part of the weight of tailgate 14 is supported by first cable 26. First cable 26 and second cable 27 are attached at side walls 17 at attachment points 85 as shown in FIGS. 1 and 3. The connections 86 used at attachment points 85 are the standard types used in conventional pickup trucks for easy removal of tailgate 14. The installation of spring 22 and dampener 101 to tailgate 14 facilitates the removal of tailgate 14 in the conventional manner.

First cable 26 extends from sidewall 17 along longitudinal axis 31 to pulley 66. Pulley 66 directs cable 26 from a lateral axis 30 to a longitudinal axis 31 that is transverse to lateral axis 30. In this way, pulley 66 permits spring 22 and dampener 101 to extend and compress along lateral axis 30, rather than along longitudinal axis 31, thereby allowing storage of spring 22 and dampener 101 in tailgate 14.

First cable 26 serves as a draw cable to draw tailgate 14 to sidewalls 17 of vehicle body 18 as spring 22 decompresses (see FIG. 4) when the tailgate 14 is moved toward the closed position 21 (see FIG. 2). In this way, spring 22 provides lift assistance to tailgate 14. A catch 34 is attached to rod 62. When tailgate 14 moves to open position 15, as shown in FIGS. 1 and 3, first cable 26 pulls catch 34, rod 62 and first piston 58 along arrow C, thereby compressing spring 22 (see F*igure* 3). The compression of spring 22 slows movement of tailgate 14 to open position 15. The dampening effect of dampener 101 acts to slow movement of tailgate 14 by slowing movement of first piston 58 and consequently rod 62.

Cable stop 38 is mounted within the interior 23 of tailgate 14 and is used to stop movement of first cable 26 and catch 34 along lateral axis 30 as tailgate 14 is extended to open position 15. In so doing, cable stop 38 prevents a significant portion of weight of tailgate 14 and any associated payload from being exerted on the dampener 101 and spring 22. The second cable 27 is used to support these heavy loads.

In addition, when catch 34 is stopped by cable stop 38 in open position 15, latching device 46 may serve to lock catch 34 in place. By locking catch 34 in place, spring 22 is held in position and is disengaged from providing lift assistance to tailgate 14. Latching device 46 may comprise a latching pawl that simply blocks movement of catch 34 along arrow D. Latching device 46 may be linked to a vehicle gate latch actuator 70 so that when vehicle gate latch actuator 70 is actuated, latching device 46 may also be actuated automatically. After tailgate 14 is lowered, an operator may toggle vehicle gate latch actuator 70 to lock latching device 46, or latching device 46 may be spring-loaded to lock automatically, and thereby disengage lift assistance by locking spring 22 into its compressed state. In this way, the lift assistance provided by spring 22 is decoupled thereby permitting the full weight of tailgate 14 to keep tailgate 14 in its open position (see FIG. 1) and helping to avoid the fluttering of tailgate 14 during vehicle operation. When lift assistance is required, door latch 70 may be toggled to unlock latching device 46 and thereby permit movement of catch 34 in the direction of arrow D and thereby allow spring 22 to provide lift assistance.

The aforementioned description is exemplary rather that limiting. Many modifications and variations of the present invention are possible in light of the above teachings. The preferred embodiments of this invention have been disclosed. However, one of ordinary skill in the art would recognize that certain modifications would come within the scope of this in invention. Hence, within the scope of the appended claims, the invention may be practiced otherwise than as specifically described. For this reason the following claims should be studied to determine the true scope and content of this invention.

What is claimed is:

1. A vehicle gate assembly for a vehicle, the vehicle gate assembly comprising:
    a vehicle gate hingable to a vehicle body for pivotal movement about a lateral axis between a first position and a second position;
    a spring mountable within said vehicle gate to provide lift assistance as said vehicle gate is moved from said first position to said second position:
    a dampener mountable within said vehicle gate and connected to said spring to control pivotal speed as said vehicle gate is moved from said second position to said first position; and
    a latching device having a first latch position in which said spring is prohibited from providing lift assistance and a second latch position in which said spring is released to provide lift assistance, wherein said latching device is operably coupled to a vehicle gate latch actuator, wherein said dampener comprises a piston disposed within a cylinder and wherein said spring is enclosed within said cylinder for reaction against said piston.

2. The vehicle gate assembly of claim 1 wherein said latching device comprises a pawl selectively engageable with a rod to lock said spring.

3. The vehicle gate assembly of claim 1 including a cable having a first end mountable to a vehicle structure and a second end operably coupled to said piston with a rod.

4. A vehicle gate assembly for a vehicle, the vehicle gate assembly comprising:
    a vehicle gate hingable to a vehicle body for pivotal movement about a lateral axis between a first position and a second position;
    a spring mountable separate from said vehicle body to provide lift assistance as said vehicle gate is moved from said first position to said second position; and
    a dampener mounted separate from said vehicle body and connected to said spring to control pivotal speed as said vehicle gate is moved from said second position to said first position, wherein said dampener comprises a piston disposed within a cylinder and wherein said spring is enclosed within said cylinder for reaction against said piston.

5. The vehicle gate assembly of claim 4 including a cable having a first end mountable to a vehicle structure and a second end operably coupled to said piston with a rod.

* * * * *